United States Patent [19]

Sharkins et al.

[11] 3,994,586

[45] Nov. 30, 1976

[54] SIMULTANEOUS DETERMINATION OF FILM UNIFORMITY AND THICKNESS

[75] Inventors: Allen J. Sharkins; William H. Tingle, both of Lower Burrell, Pa.

[73] Assignee: Aluminum Company of America, Pittsburgh, Pa.

[22] Filed: Oct. 30, 1975

[21] Appl. No.: 627,214

[52] U.S. Cl. .................................. 356/73; 250/339; 250/341; 356/51; 356/161; 356/199
[51] Int. Cl.² .................... G01N 21/00; G01B 11/00
[58] Field of Search ............... 356/51, 73, 161, 199, 356/200; 250/339, 341, 349, 350

[56] References Cited
UNITED STATES PATENTS

| | | | |
|---|---|---|---|
| 3,017,512 | 1/1962 | Wolbert | 250/349 |
| 3,325,649 | 6/1967 | Bird | 356/51 |
| 3,737,237 | 6/1973 | Zurasky | 356/151 |
| 3,825,755 | 7/1974 | Ruskin | 250/239 |

*Primary Examiner*—Vincent P. McGraw
*Attorney, Agent, or Firm*—David W. Brownlee

[57] ABSTRACT

A method and apparatus are disclosed for simultaneously determining thickness and uniformity of a supported film which is at least partially translucent by directing a beam of radiation at the film at an angle thereto, reflecting a portion of the radiation from the interface of the film and substrate back through the film, splitting a portion of the reflected radiation into a first beam portion which is monitored to determine uniformity of film thickness, and a second beam portion which is chopped and split again into a reference beam and a thickness determining beam which are filtered and transduced so that the resulting signals can be compared to determine film thickness.

26 Claims, 6 Drawing Figures

SIMULTANEOUS DETERMINATION OF FILM UNIFORMITY AND THICKNESS

BACKGROUND OF THE INVENTION

The instant invention relates generally to film monitoring and, more particularly, to an improved method and apparatus for optically monitoring thin flims for simultaneously determining the thickness and the degree of uniformity.

The apparatus and methods of the invention were specifically developed for determining parameters of thin radiation-transmissive films of material that may be formed as self-supporting sheets or as coatings on a base sheet. By way of example, a thin film of an organic material, such as polyethylene, may be formed on a relatively thick base sheet formed from paper or metal foil. Typically, a great many metal cans, such as aluminum cans, have applied to one or more of their surfaces a protective organic resin film such as above-described. To perform their functions adequately as protective barriers, it is necessary that these films have a certain critical minimum thickness. To insure the existence of this minimum thickness, it is common practice to apply a coating in its wet state in greater than necessary amounts as a sort of safety factor. Quite obviously, the application of this excess coating is uneconomical and leads to fabrication difficulties. A characteristic of the film with which the invention is concerned is that the film formed either as a self-supporting sheet or as a coating, has specular surfaces and will be strongly reflective of radiation incident to either a first surface or second surface, including a second surface which is the interface surface between the film and an underlying base sheet. Radiation incident to the film will be reflected at the first and second surfaces and, in the case of a reflection-type measurement, the reflected component subsequently detected by electrical radiation sensors connected in a circuit to provide an output signal or readout that is indicative of the particular parameter of interest. In the case of a through-transmission type measurement, the radiation sensors would be positioned at the side of the film opposite the radiation source to detect radiation transmitted through the film.

Various gauges for accurately measuring the organic coating applied to a metal substrate have been considered. However, to be truly effective, the coating thickness gauge should desirably be capable of measuring the coating immediately after application, while it is still wet, so that immediate alterations in the coating operation can be made to vary the coating thickness if necessary. Since the coating is not in a dry, handleable state for several seconds after its initial application, measurements at a point after the coating is dry would permit the production of considerable improperly coated sheet prior to detection thereof in a coating line moving at several hundred feet per minute. Further, any accurate measurement of a wet, mobile, fluid coating must omit physical contact between the measurement device and the coating. Also, to insure no interruption in production, the measurement should be made while the coated sheet is moving.

A reflection-type, dual-beam infrared measurement system for determining film thickness is disclosed in U.S. Pat. No. 3,017,512 issued to H. J. Wolbert on Jan. 16, 1962. Wolbert's apparatus relies on passing infrared radiation through a film or coating carried on a reflective surface of an opaque substrate. The incident radiation is reflected from the surface and out through the coating. Means are provided for selecting from the emitted infrared radiation a beam of light, a portion of the energy of which is absorbed by the coating due to the chemical structure thereof, and another beam of the emitted radiation whose wave length is such that none of this energy is absorbed by the coating. Wolbert characterized the partially absorbed beam as a sample beam and the non-absorbed beam as a reference beam.

Wolbert, makes use of a known relationship between the absorption of radiant energy and the amount of absorptive material in the path of the radiant energy which may be characterized as follows: log of $I_0/I = kcd$ where; $I_0$ is the intensity of the reference beam striking the detector; $I$ is the intensity of the sample beam striking the detector; $k$ is a constant; $c$ is the concentration of absorptive material in the sample; and $d$ is the thickness of the sample. Wolbert has taught that while the above relationship was previously used mainly in determining the concentration of a certain substance in a sample by transmitting light through the sample of known thickness, the relationship is equally effective in determining thickness of a mobile, liquid film on an opaque but reflective substrate by passing the radiation into the coating and out again by reflecting the radiation from the substrate. Because there is a direct relationship between the thickness of a sample film and a difference between $I_0$ and $I$, the need to determine $I_0$ and $I$, separately in order to calculate $d$ is obviated.

It has been found that infrared light is particularly applicable in the method and apparatus of Wolbert inasmuch as substantially all organic compounds will absorb infrafred radiation at specific frequencies within that range. The specific frequency or wave length at which the radiant energy is absorbed is a characteristic of the structure of the compound. The amount of radiant energy absorbed by the organic chemical is directly related to the quantity of absorbing chemicals in the path of the radiation.

One type of problem which occurs when measuring film thicknesses with a device such as is taught by Wolbert resides in the fact that Wolbert must chop or break up the radiation incident on the film to provide an AC output which per force must yield an average thickness determination for the whole region of the film moving past a given location in the time interval between successive pulses of light from the chopped reference and sample beams. Obviously, a particular readout may or may not provide a good indication of acceptable film thickness depending on whether or not the film being sampled is uniform.

Another problem which arises with either a through-transmission type measurement or a reflection type measurement such as is taught by Wolbert with respect to a film having specular surfaces is that there will be both first and second surface reflections which occur at the opposite surfaces of a self-supporting film or, in the case of a coated base sheet, at the respective outer or exposed surface of the film and the opposite surface at the interface of the film in the base sheet. While the first and second surface reflections produce respective signal components, these reflection components for each specific wave length suffer phase displacement which, depending on the thickness of the film, may interfere with one another and result in an output signal, in part, which is a function of this phase displacement. With one of the beams of radiation of a wave length selected to not exhibit a characteristic absorption with respect to either the film or base sheet and the other wave length selected to exhibit a characteristic absorption as to the film, it is evident that, at certain film thicknesses, variations in relative phase displacements of the refelected components will occur due to the interference phenomenon and produce corresponding variation in the detected signals with consequent error in the measurement.

Many attempts have been made in the prior art to solve the interference problem described above and typical of the suggested solutions are those found in U.S. Pat. No. 3,631,526 issued to Donald C. Brunton on Dec. 28, 1971. Briefly, Brunton utilizes a system similar to that of Wolbert, supra, wherein a first aspect of his solution Brunton directs each beam of radiation in a wide angle toward the surface of the film to be incident thereto at a relatively broad spectrum of angles rather than a single specific angle of incidence as in the case of Wolbert. This angle of incidence spectrum is selected to be of such breadth that reflection components will be added at all possible phase angles for each beam of radiation and the effect of interference between first and second surface reflection components for each beam is minimized. As a further refinement of his wide-angle technique, Brunton teaches selecting the reference and sample wave lengths to be sufficiently close together so that the relative phase displacement between the respective first and second surface reflection components will be minimal. Brunton teaches a third technique which may be utilized in combination with the wide-angle reflection technique or which may be utilized independently and which comprises the utilization of a relatively broad spectral band of wave lengths for the reference and sample radiation beams. Brunton teaches that utilization of a sufficiently broad spectral band of wave lengths will also result in the addition of reflection components at all possible phase angles with consequent minimization of interference error.

The prior art fails to disclose a system for simultaneously monitoring both thickness and uniformity of a rapidly moving film or such a system which is not adversely affected by interference error due to reflectance from the upper surface of the film. Non-uniformity of films frequently occurs as close together as one-quarter inch along the length of a strip moving at 500–600 or more feet per minute, and any system for monitoring such non-uniformity must have a rapid response time in order to be useful. On the other hand, monitoring of thickness will be more practically accomplished on the basis of a readout every one-third second or even less often. If thickness readouts were provided any more often, the result would produce a blur of number readings which would make utilization difficult. Accordingly, a system is desired for continuously monitoring the uniformity of a rapidly moving film and also separately and simultaneously monitoring the thickness of the film.

SUMMARY OF THE INVENTION

The subject invention resides in a method and apparatus for simultaneously monitoring uniformity and thickness of rapidly moving thin films or coatings. The invention relies on the fact that various thin films and coatings are selectively absorptive to particular optical wave length bands.

It is contemplated to utilize a reflective technique wherein a beam of infrared radiation of a predetermined frequency or band of frequencies is caused to impinge on a moving film or coating in such a way as to be reflected to a detector from the bottom surface of the film or coating after being partially absorbed in passing through said film or coating.

The reflected radiation may be chopped to provide chopped radiation which is split into two beams which are directed at optical filters to select from one beam radiation having a wave length which is not absorptive with respect to the film and from the other beam radiation having a wave length which is absorptive with respect to the film. The two beams are then transduced to provide output signals which differ in an amount proportional to the film thickness. A portion of unchopped reflected radiation may also be transduced to provide a signal which is a function of film uniformity.

In order to prevent any unwanted reflection from the upper surface of the film or coating from optically interfering with reflection from the bottom surface of the film or coating, the beam of incident infrared radiation is preferably made to impinge on the coating or film at Brewster's Angle to thereby plane polarize the beam in a predetermined direction. Additionally, a polarizing medium such as a germanium optical flat may be placed between the film or coating and the detectors so as to intercept the radiation reflected from the top surface of the film or coating, preferably at Brewster's Angle. When the germanium optical flat is positioned as foresaid, it will prevent any radiation reflected from the top surface of the film or coating with a predetermined polarization plane from being transmitted to the detector because the germanium optical flat is positioned such that its angle of polarization is perpendicular to the plane of polarization of the reflected radiation from said first surface. To further assure that no unwanted radiation is reflected from the upper surface of the film or coating to the detector, a second germanium optical flat may be interposed between the radiation source and the film or coating so as to intercept the incident radiation, preferably at Brewster's Angle. By positioning the second germanium optical flat as foresaid, little if any raidation will be reflected from the upper surface of the film or coating to the first mentioned germanium optical flat which will promptly remove any residue.

Thus, in its broader aspect the invention resides in the simultaneous monitoring of both thickness and uniformity of a film or coating using optical band pass radiation which is partially absorbed and partially transmitted by the film. In a preferred embodiment infrared radiation is directed at the film supported on an aluminum substrate so that the radiation will be incident on an otherwise reflective surface at Brewster's Angle to effect plane polarization of the radiation reflected from the reflective surface in a first direction and subsequently directing the transmitted radiation and reflected radiation at a polarizing material so oriented as to block the plane polarized light reflected from said reflective surface. Alternatively, a polarizing medium may be interposed between the radiation source and the reflected surface to plane polarize the light in a direction such that said light, when incident on said sueface at Brewster's Angle, will not be reflected therefrom. As a third alternative, a polarizing medium may be interposed between both the source of radiation and the reflective surface and the reflective surface and a detector with both polarizing mediums being oriented as if each were used alone and with the radiation incident on the reflective surface at Brewster's Angle.

It should be understood that the physical principle underlying the use of Brewster's Angle and a polarizing medium resides in the fact that the germanium optical flat will pass radiation incident thereon at Brewster's Angle such that the plane of polarization of the transmitted radiation will correspond to the vertical component of the incident radiation. Further, it is characteristic of the film that radiation incident thereon at Brewster's Angle will have its vertical component transmitted and its horizontal component reflected from the upper surface of the film. If the film is horizontal, it is clear that the reflected radiation will be plane polarized parallel to the reflective surface of the film. Accordingly, if the radiation incident on the film at Brewster's Angle has no component parallel to the reflective surface of the film, there will be no radiation reflected by first surface of the film. The same principle is operative, independent of whether the transmission polarizing medium is placed in the path of the incident or reflected radiation. Reference may be made to Jenkens and White, Fundamentals of Optics, (3d Ed. 1957) for a background information respecting polarization of light and Brewster's Law.

While the above-described concept is applicable to a wide variety of optical instrumentation, a specific application of the foregoing concept resides in a method and apparatus for simultaneously monitoring the uniformity and thickness of a thin film or coating on a moving substrate. In this embodiment a continuous beam of wide band infrared radiation is directed onto the moving film at Brewster's Angle. A portion of the radiation incident on the film is reflected from the undersurface thereof to a detector which provides an output signal which is a function of the amount of radiation absorbed by the film which in turn is a function of the uniformity of the thickness of the film. Another portion of the radiation reflected from the undersurface of the film is chopped to provide chopped radiation, and the chopped radiation is split into two beams which are directed at optical filters to select from one beam radiation which is non-absorptive with respect to the film and from the other beam which is absorptive with respect to the film. The two beams are transduced to produce two output AC signals which differ in an amount proportional to film thickness. Transmission polarizers are placed in the path of either the incident radiation, the reflected radiation or both in accordance with the aforementioned teachings to block any unwanted reflection from the upper surface of the film.

An object of the present invention is to provide improved infrared optical means for determining parameters of thin films or coatings.

Still another object of the present invention resides in the provision of an improved reflection-type optical method and apparatus for measuring parameters of fast moving, thin films and coatings without dependent optical interference.

Yet another object of the instant invention is to provide an improved, more accurate and simpler optical monitoring system and apparatus than heretofore available.

It is a further object of the instant invention to provide polarimetric means for blocking first surface reflection in an optical system for simultaneously measuring uniformity and thickness of a moving film or coating.

A still further object of the subject invention resides in the provision of a method and apparatus for preventing optical interference and attendant error in a reflection-type optical measuring system caused by interference between light reflecting from a first surface of a film and phase-displaced light from a second surface of said film.

A still further object of the present invention is to provide a method and apparatus for use in conjunction with an optical film thickness gauge of the type employing a selectively chopped infrared beam incident on a thin film, for providing a continuous indication of film uniformity.

A still further object of this invention is to provide a method and apparatus for continuously and simultaneously monitoring the uniformity of the thickness and the actual thickness of a thin film or coating utilizing a continuous beam of light incident on the moving film.

DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein.

DETAILED DESCRIPTION OF THE INVENTION

Figure 1:
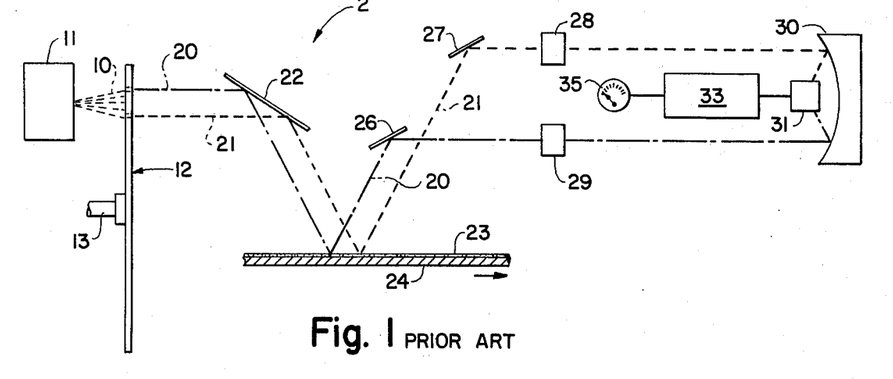
FIG. 1 provides a diagrammatic illustration of a prior art coating thickness gauge.

Referring to the drawings in more detail and, more particularly, to FIG. 1, a prior art coating thickness gauge is illustrated generally at 2. Polychromatic infrared radiation is illustrated generally at 10 and emanates from a source such as an uncovered, electrically heated, platinumrhodium winding installed in a polished cylindrical housing 11 of stainless steel having a properly located opening to direct the radiation into the desired channel. The radiation 10 strikes an interrupter or chopper generally designated 12, rotated at a constant speed on a shaft 13 by a suitable source of motive power not shown. The chopper 12 comprises a disc (not shown) which has portions of its periphery removed to form notches. Adjacent its unnotched periphery, the disc has arcuate slots (not shown) and the configuration of the chopper is well-known in the art and more fully described in Wolbert, supra. By rotating at a constant velocity in the path of the emitted radiation 10, the chopper 12 breaks this emitted radiation into two separate beams, the beam 20 and the beam 21 which, after optical filtration more fully described, infra, will become the reference beam and the sample beam, respectively. One beam is permitted to pass the chopper 12 by virtue of the notches whereas the other beam is transmitted through the slots with the transmission of each beam taking place intermittently and alternately with the other beam.

The two beams 20 and 21, traveling in parallel paths, strike an angularly disposed mirror 22 and are reflected downwardly toward a coating 23 to be measured and carried on the reflective surface of a moving sheet metal substrate 24. Each beam 20 and 21 passes through the coating 23, strikes the reflective surface and is reflected upwardly out of the coating. As will be pointed out infra, a portion of each of the beams 20 and 21 will also be reflected from the upper surface of the coating 23.

After their reflectance from the surface of the substrate 24 and their second passage through the coating 23, the beam 20 and the beam 21 strike angularly disposed mirrors 26 and 27, respectively; and are reflected through optical filters 28 and 29, respectively. The optical filters 28 and 29 remove from each beam all radiant energy of a wave length other than that desired, making each beam monochromatic and transforming them into the reference beam 20 and sample beam 21.

The reference beam 20 and the sample beam 21 strike a concave mirror 30 and are reflected intermittently into a detector 31. The detector 31 generates a small current according to the intensity of the infrared radiation of the reference beam 20 and the sample beam 21 striking it. The beams must strike the detector one at a time and alternately. This intermittent, alternate passage of the reference and sample beams is accomplished by the chopper 12, which also breaks the intermittent light into substantially single parallel beams in a well-known manner.

The voltage generated by the detector 31 is passed through an amplifier 33, whereupon it is amplified to a conveniently usable level and thereafter transmitted to a visual output device such as the meter 35.

Figure 2:
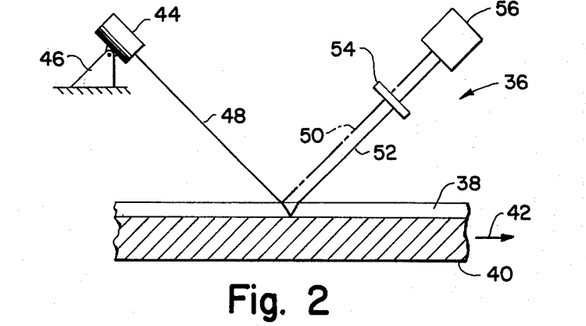
FIG. 2 provides a diagrammatic illustration of a uniformity monitoring system without polarimetric interference elimination.
Figure 3:
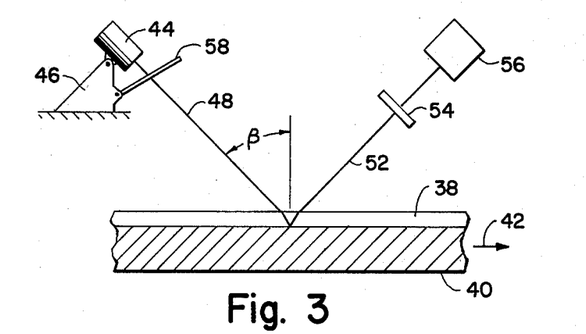
FIG. 3 provides a diagrammatic iillustration of the optical system of FIG. 2 employing a transmission polarizer in the path of the radiation incident on the film and thereby eliminating optical interference.
Figure 4:
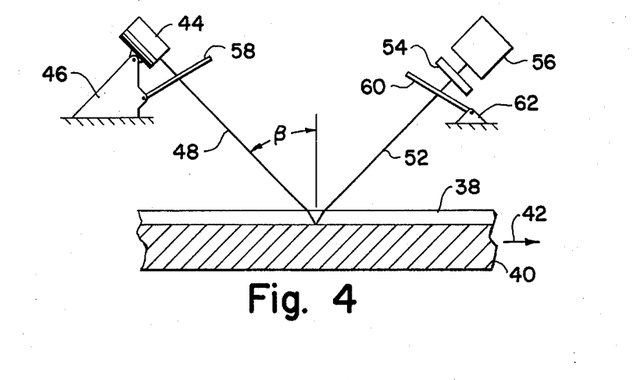
FIG. 4 provides a diagrammatic illustration of the apparatus of FIG. 2 employing transmission polarizers on both the incident beam of radiation on the film and the reflected beam of radiation on the film thereby eliminating optical interference.

Referring again to FIG. 2, a uniformity monitoring system is illustrated generally at 36 and is illustrated in conjunction with a thin film or coating 38 supported on a reflective metal substrate such as an aluminum substrate 40. As best seen in FIGS. 2, 3 and 4, the film 38 and substrate 40 are indicated as moving in the direction of the arrow 42 at what in practice may be speeds on the order of 1,000 feet per minute. A source of polychromatic infrared radiation is indicated generally at 44 pivotally supported in a well-known manner as by a base 46 such that the angle of incidence between the radiation emanating from the source 44 with respect to the plane of the film 38 may be controlled as desired. Typically, the source 44 may comprise an electrically heated strip of nicron ribbon suitably supported or may be similar that described in connection with the housing 11 of FIG. 1, supra. Polychromatic radiation emanating from the source 44 and directed toward the film 38 is illustrated generally at 48 and, as best illustrated in FIG. 2, a portion of the radiation 48 reaching the top surface of the film 38 is reflected therefrom as the beam 50. Similarly, a portion of the beam 48 reaching the top surface of the film 38 is transmitted therethrough and reflected from the interface between the film 38 and the substrate 40 back through the film 38 as the beam 52. The beams 50 and 52 are transmitted through a narrow band pass optical filter 54 designed to transmit a narrow band of infrared radiation having a wave length or frequency with respect to which the film 38 is absorptive. The chemical ingredients in the coating will determine the operable wave length of such radiation. For example, radiation having a wave length of approximately 3.43 microns is suitable for an exemplary organic coating used on rigid container sheet. After passing through the filter 54 the radiation impinges on a detector such as the detector 56 (Pyroelectric IR Detector Model No. KT-2000 Series manufactured by Laser Precision Corporation and commercially available). The detector 56 provides an electrical output signal indicative of the uniformity or lack thereof of the film 38 and may be subsequently fed to a visual readout such as is common in the art, such as by an oscilloscope trace and/or a meter read in percent non-uniformity.

In using a uniformity detector such as described, it is necessary to detect discontinuities in the direction of travel as small as ¼ inch. The imperfections or irregularities in the film 38 moving past the incident beam of radiation 48 will cause the amplitude of the output beam 52 to vary in intensity at a frequency which is the function of the size of the discontinuities or non-uniformities in the film 38, the spacing between such non-uniformities, the size of the optical window and the speed of the film in the direction 42. It is also desirable in many cases to cause the source of radiation 44 to traverse the film transversely of the direction of travel 42 to monitor a larger region of the surface of the film 38.

In practice because of the size and number of the non-uniformities in the film 38 and because of the speed of the film, optical interference taking place between the reflected beams 50 and 52 (due to their phase displacement by the film) may make it impossible in many instances to satisfactorily monitor film uniformity.

In an effort to minimize the optical interference caused by the unwanted reflection of the beam 50, reference may be had to the embodiments of FIGS. 3 and 4. To the extent that the components of FIGS. 3 and 4 are identical to those of FIG. 2, the same reference numerals have been used to designate corresponding parts. As seen in FIGS. 3 and 4, the source of polychromatic infrared radiation 44 is positioned with respect to its base 46 so as to direct the radiation 48 onto the film 38 at Brewster's Angle Beta. Furthermore, a transmission polarizer 58 is interposed between the source 44 and the film 38 and positioned with respect to the base 46 such that the beam 48 impinges on the surface of the polarizer 58 at Brewster's Angle for such polarizer 58. As is explained in Jenkins and White, Fundamentals of Optics, (3d Ed. 1957), Brewster's Angle is the angle of incidence for maximum polarization of the radiation or light. The effect of positioning the polarizer 58 at Brewster's Angle with respect to the beam 48 is such that the radiation 48 transmitted through the polarizer 58 will be plane polarized by eliminating the horizontal components thereof. When the plane polarized radiation 48 impinges on the film 38 at Brewster's Angle for the said film 38, it will be substantially transmitted through the film 38 and reflected from the interface between said film 38 and the aluminum substrate 40 as the beam 52. Inasmuch as the upper face of the film 38 can only reflect the horizontal component (parallel to the plane of the film 38) of the radiation 48 incident thereon at Brewster's Angle, and inasmuch as the radiation 48 is plane polarized so as not to contain the horizontal component, it should be clear that there will be no reflection from the upper surface of the film 38 in the form of a beam 50 as in FIG. 2. Consequently, optical interference errors inherent with the device of FIG. 2 will be substantially eliminated with the device of FIG. 3. It should be noted, however, that in practice the polarization effected by the polarizer 58 and the upper surface of the film 38 is not complete and there may be some undesired component reflected in the form of the undesired beam 50. In order to minimize any unwanted reflection from the upper surface of the film 38 resort may be had to the embodiment of FIG. 4. Essentially, the embodiment of FIG. 4 differs from that of FIG. 3 in incorporating a second transmission polarizer 60 which is pivotally secured to a support 62 in a wellknown manner. The transmission polarizer 60 is interposed between the detector 56 and the film 38 in the path of the beam 52 reflected from the interface of said film 38 and the substrate 40. The polarizer 60 is pivoted with respect to its support 62 so as to cause the beam 52 to be incident thereon at Brewster's Angle, whereby aid polarizer 60 will only pass light whose plane of polarization contains the vertical component passed by the polarizer 58. However, some polarizing means are not restricted to disposition at Brewster's Angle. Thus, the polarizer 60 will block any residual reflected energy having a horizontal component such as the beam 50 of FIG. 2. It should be emphasized at this point that the polarizers 58 and 60 may take the form of any known transmission polarizing material, the selection of which is within the purview of those skilled in the art. Typically, however, the polarizers 58 and 60 may comprise germanium optical flats such as may be commercially obtained from Laser Precision Corporation.

It should now be evident that the problem inherent in the unwanted reflection of the beam 50 from the surface of the film 38 as is the case in the embodiment of FIG. 2 will also happen in a prior art device such as that of FIG. 1. Indeed in the embodiment of FIG. 1 such unwanted reflection will occur with respect to both the reference beam 20 and the sample beam 21. It should also be clear from the disclosure contained herein that the generic teachings of the subject invention can also be put to use in the coating thickness gauge of FIG. 1 by controlling the angle of incidence of the beams 20 and 21 onto the film 23 at Brewster's Angle and by suitably positioning transmission polarizers in the paths of the beams 20 and 21 either before or subsequent to their incidence and reflection, respectively, from the film 23. It should also be apparent from this disclosure that an additional polarizer may be used as is the case of the embodiment of FIG. 4 to thoroughly eliminate any residual unwanted reflection in the device of FIG. 1.

Figures 5, 5A:
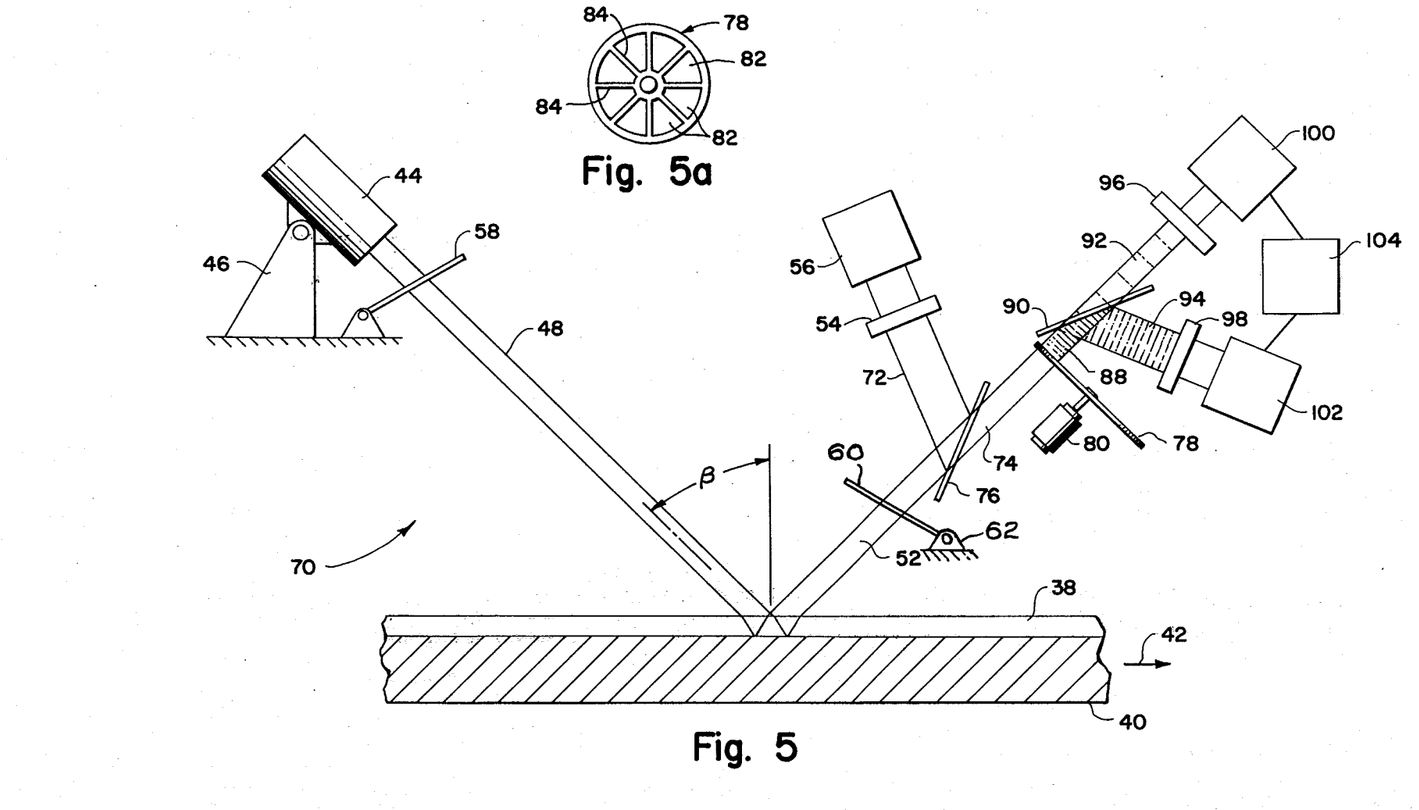
FIG. 5 provides a diagrammatic illustration of a novel system for simultaneously monitoring uniformity and thickness of a moving film which is at least partially reflective.
FIG. 5a provides an illustration of a wheel for chopping optical radiation.

FIG. 5 illustrates a preferred embodiment of a system of this invention generally designated by the numeral 70. To the extent that the components of FIG. 5 are identical to those of FIGS. 1-4, the same reference numerals have been used to designate corresponding parts. As seen in FIG. 5, a source of polychromatic infrared radiation 44 is positioned with respect to its base 46 so as to direct the radiation 48 onto the film 38 at Brewster's Angle Beta. A transmission polarizer 58 is interposed between the source 44 and the film 38 and positioned with respect to the base 46 such that the beam 48 impinges on the surface of the polarizer 58 at Brewster's Angle for such polarizer 58. The effect of positioning the polarizer 58 at Brewster's Angle with respect to the beam 48 is that the radiation 48 transmitted through the polarizer 58 will be plane polarized by eliminating the horizontal components thereof. When the plane polarized radiation impinges on the film 38 at Brewster's Angle for such film, substantially all of it will be transmitted through the film and reflected from the interface between the film and the aluminum substrate 40 as the beam 52. Since the upper face of the film 38 primarily reflects the horizontal component (parallel to the plane of the film 38) of the radiation 48 incident thereon at Brewster's Angle, and since the radiation 48 is plane polarized so as not to contain the horizontal component, there will be substantially no reflection from the upper surface of the film 38.

In a preferred embodiment of the invention, a second transmission polarizer 60 on a pivotable support 62 is interposed in the path of the reflected beam 52 between the film 38 and a beam splitter 76. The polarizer 60 is preferably pivoted with respect to its support 62 so as to cause the beam 52 to be incident thereon at Brewster's Angle. As in the apparatus of FIG. 4, the polarizer 60 will block any residual reflected radiation having a horizontal component.

The reflected beam of radiation 52 is split or divided by a beam splitter 76 into two portions or beams 72 and 74. The beam splitter 76 is commercially available in the form of a germanium optical flat which reflects some radiation and transmits some radiation, and is available from a number of sources such as Laser Precision Corporation.

The beam 72 which has been split from beam 52 is transmitted through a narrow band pass optical filter 54 designed to transmit a narrow band of infrared radiation of a frequency with respect to which the film 38 is absorptive. As is stated above, the particular chemical ingredients in the film will determine the operable wave length which is passed by the filter, and therefore the nature of the filter. For example, a band pass filter having center pass frequency of approximately 3.43 microns is suitable for an exemplary organic coating for rigid container sheet. After passing through the filter 54 the radiation impinges on a detector such as the detector 56 which provides an electrical output signal indicative of the uniformity of film thickness or lack thereof and may be subsequently fed to a visual readout such as is common in the art.

The beam portion 74 which passes through the beam splitter 76 is chopped by means of a mechanical chopping wheel 78 to break up the radiation. The wheel 78 which is powered by a motor 80 is adapted to rotate at a rapid speed so that a portion of the radiation in beam 74 will pass through the apertures 82 in the wheel and the remainder of the radiation will be chopped out by the spokes 84. The chopping wheel 78 may, for example, be rotated at approximately 3600 rpm to provide chopped radiation in the beam 88 which passes through the wheel. The chopped radiation in beam 88 is directed to impinge upon a second beam splitter 90 which divides or splits the beam into two beams of radiation 92 and 94. One beam of radiation 92 is directed at a narrow band pass optical filter 96 which passes radiation having a frequency which is nonabsorptive with respect to the film 38, and the other beam 94 of radiation is directed at a narrow band pass optical filter 98 which passes radiation having a frequency which is absorptive with respect to the film. The radiation which passes through the filters 96 and 98 impinges on first and second detectors 100 and 102 respectively which provide AC electrical output signals which differ by an amount proportional to film thickness. The output signal produced by the beam of radiation which is non-absorptive with respect to the film 38 provides a reference which does not vary as a result of film thickness, whereas the output signal produced by the beam of radiation for a frequency which is absorptive with respect to the film will vary in proportion to film thickness. A comparison of the two output signals will therefore produce a reading which is proportional to the film thickness, but which is not affected by noise in the system or by variations in the intensity of the radiation emanating from the source 44. Further, since both the reference output signal and the thickness output signal are derived from a single beam incident at a single point of the film, the measurement is more accurate than are thickness measurements made using prior art devices in which two discrete beams are impinged on a film at different locations. The reference and thickness determinative signals are compared by means of an electrical comparator 104, and the comparison signal fed to a visual readout such as is common in the art. The readout may be in microns, milligrams per square inch or other units of film thickness or weight per unit area.

This invention is particularly well suited for monitoring both thickness and uniformity of a rapidly moving films as for example monitoring the film or coating on a strip of sheet metal which travels up to several hundred feet per minute. The apparatus of this invention has a rapid response time which monitors both thickness and uniformity of the coating on such a rapidly moving strip to provide a readout every one third of a second.

It is therefore seen that a system is provided for simultaneously measuring both the thickness and the uniformity of a film using a single beam of radiation which is incident at a single point on a film and which is not adversely affected by variations in power and noise in the system which have adversely affected prior art devices.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. For example, the basic invention can also be utilized to simultaneously monitor uniformity and thickness of an unsupported film by using a transmitted radiation instead of reflected radiation. It is, therefore, to be understood that within the scope of the appended claims, the instant invention may be practiced in a manner otherwise than is specifically described herein.

What is claimed is:

1. A method of simultaneously determining thickness and uniformity of a moving film or coating including the steps of:
    directing a beam of optical radiation at said film for transmission of the radiation through the film;
    splitting the radiation which has been transmitted through the film into a uniformity determinative beam and a thickness determinative beam;
    transducing said uniformity dterminative beam to provide an output signal which is a function of the uniformity of the thickness of said film;
    chopping said thickness determinative beam to provide chopped radiation;
    splitting said chopped radiation into first and second beams;
    selecting from said first beam radiation which is absorptive with respect to said film and selecting from said second beam radiation which is non-absorptive with respect to said film; and
    transducing said first and second beams of radiation to provide output signals which differ by an amount which is a function of film thickness.

2. A method as set forth in claim 1 in which the film is supported on a metal substrate and the radiation is directed at the film at an angle incident to the surface of the film to be transmitted through the film and reflected from the surface of the metal substrate at the interface between the film and the substrate.

3. A method as set forth in claim 2 in which said radiation is directed at a polarizing medium.

4. A method as set forth in claim 3 wherein said polarizing medium is so oriented that the radiation transmitted therethrough intercepts same at Brewster's Angle.

5. A method as set forth in claim 4 in which said radiation intercepts said film at Brewster's Angle.

6. A method as set forth in claim 1 in which said beams of radiation are passed through narrow band pass optical filters prior to being transduced to provide wave lengths of the desired frequencies.

7. In a process for measuring parameters of a moving film or coating wherein a beam of optical radiation is directed at the film for transmission of the radiation through the film and thereafter transduced to provide an output signal indicative of film parameters, a method of simultaneously monitoring film thickness and uniformity including the steps of:
    splitting the beam of radiation which is transmitted through the film into a uniformity determinative beam and a thickness determinative beam which is chopped and again split into first and second beams which are passed through filters to select from said first beam radiation having a frequency which is absorptive with respect to said film and ffrom said second beam radiation having a frequency which is non-absorptive with respect to the film.

8. A method as set forth in claim 7 in which the film is supported on a metal substrate and the radiation is directed at the film at an angle incident to the surface of the film to be transmitted through the film and reflected from the surface of the metal substrate at the interface between the film and the substrate.

9. A method as set forth in claim 8 in which said radiation is directed through a polarizing medium.

10. A method as set forth in claim 9 wherein said polarizing medium is so oriented that the radiation transmitted therethrough intercepts same at Brewster's Angle.

11. A method as set forth in claim 10 in which said radiation intercepts said film at Brewster's Angle.

12. A method as set forth in claim 7 in which said beams of radiation are passed through narrow band pass optical filters prior to being transduced to provide wave lengths of the desired frequencies.

13. A method of simultaneously determining thickness and uniformity of a film or coating having first and second at least partially reflective surfaces, including the steps of:

directing a beam of optical radiation into said first surface at a predetermined angle so as to plane polarize any radiation reflected from said first surface, and transmitting at least a portion of the radiation through said film to said second surface;

reflecting the transmitted radiation from said second surface back through said film;

transmitting the radiation through a polarizing medium so oriented as to block any component of said radiation other than that transmitted through said film;

splitting said reflected radiation into a uniformity determinative beam and a thickness determinative beam;

selecting from said uniformity determinative beam radiation having a narrow band width with respect to which said film is absorptive;

transducing said selected radiation to provide an output signal which is a function of the uniformity of thickness of said film;

chopping said thickness determinative beam of radiation to provide chopped radiation;

splitting said chopped radiation into first and second beams which are passed through narrow band pass optical filters to select from said first beam radiation having a frequency which is absorptive with respect to said film and from said second beam radiation which is non-absorptive with respect to said film; and transducing said first and second beams of radiation to provide output signals which differ by an amount which is a function of film thickness.

14. Apparatus for simultaneously determining thickness and uniformity of a moving film or coating including:

means for directing a beam of optical radiation at said film for transmission of at least a portion of the radiation through the film;

means for splitting the radiation which has been transmitted through the film into a uniformity determinative beam and a thickness determinative beam;

means for transducing said uniformity determinative beam to provide an output signal which is a function of the uniformity of the thickness of said film;

means for chopping said thickness determinative beam to provide chopped radiation;

means for splitting said chopped radiation into first and second beams which are passed through filters to select from said first beam radiation having a frequency which is absorptive with respect to said film and from said second beam radiation which is non-absorptive with respect to said film; and means for transducing said first and second beams of radiation to provide output signals which differ by an amount which is a function of film thickness.

15. Apparatus as set forth in claim 14 in which the film is supported on a metal substrate and the radiation is directed at the film at an angle incident to the surface of the film to be transmitted through the film and reflected from the surface of the metal substrate at the interface between the film and the substrate.

16. Apparatus as set forth in claim 15 which includes a polarizing medium at which said radiation is directed to block any radiation except that which is transmitted through said film.

17. Apparatus as set forth in claim 16 wherein said polarizing medium is so oriented that the radiation directed thereat intercepts same at Brewster's Angle.

18. Apparatus as set forth in claim 17 in which said radiation intercepts said film at Brewster's Angle.

19. Apparatus as set forth in claim 14 which includes optical filters through which said beams of radiation are passed prior to being transduced to provide wave lengths of the desired frequencies.

20. In an apparatus for measuring parameters of a moving film or coating wherein a beam of optical radiation is directed at the film to be transmitted therethrough and thereafter transduced to provide an output signal indicative of film parameters, apparatus for simultaneously monitoring film thickness and uniformity including:

means for splitting the beam of radiation which is transmitted through the film into a uniformity determinative beam and a thickness determinative beam and means for chopping and again splitting said thickness determinative beam into first and second beams which are passed through means for selecting from said first beam radiation having a frequency which is absorptive with respect to said film and from said second beam radiation which is non-absorptive with respect to the film.

21. Apparatus as set forth in claim 20 in which the film is supported on a metal substrate and the radiation is directed at the film at an angle incident to the surface of the film to be transmitted through the film and reflected from the surface of the metal substrate at the interface between the film and the substrate.

22. Apparatus as set forth in claim 21 which includes a polarizing medium at which said radiation is directed prior to reaching the surface of the film.

23. Apparatus as set forth in claim 22 wherein said polarizing medium is so oriented that the radiation directed thereat intercepts same at Brewster's Angle.

24. Apparatus as set forth in claim 23 in which said radiation intercepts said ffilm at Brewster's Angle.

25. Apparatus as set forth in claim 20 which includes optical filters through which said beams of radiation are passed prior to being transduced to provide wave lengths of the desired frequencies.

26. Apparatus for simultaneously determining thickness and uniformity of a film or coating having first and second at least partially reflective surfaces, including:

means for directing a beam of optical radiation onto said first surface at a predetermined angle so as to plane polarize any radiation reflected from said first surface, and transmitting at least a portion of the radiation through said film to said second surface;

means for reflecting a portion of the transmitted radiation from said second surface back through said film;

means for transmitting the radiation through a polarizing medium so oriented as to block any component of said radiation other than that transmitted through said film;

means for splitting said reflected radiation into a uniformity determinative beam and a thickness determinative beam;

means for selecting from said uniformity determinative beam radiation having a narrow band width with respect to which said film is absorptive;

means for transducing the selected radiation to provide an output signal which is a function of the uniformity of thickness of said film;
means for chopping said thickness determinative beam of radiation to provide chopped radiation;
means for splitting said chopped radiation into first and second beams;
means for selecting from said first beam radiation having a frequency which is absorptive with respect to said film;
means for selecting from said second beam radiation which is non-absorptive with respect to said film; and
means for transducing said first and second beams of radiation to provide output signals which differ by an amount which is a function of film thickness.

* * * * *